United States Patent [19]

Matsuzawa et al.

[11] Patent Number: 5,276,517
[45] Date of Patent: Jan. 4, 1994

[54] VIDEO EQUALIZING CIRCUIT

[75] Inventors: Hiroshi Matsuzawa; Ichitaro Sato; Kaoru Urata, all of Kanagawa, Japan

[73] Assignee: Sony Corporation, Tokyo, Japan

[21] Appl. No.: 744,250

[22] Filed: Aug. 13, 1991

[30] Foreign Application Priority Data

Aug. 14, 1990 [JP] Japan .................. 2-214684

[51] Int. Cl.$^5$ .............................. H04N 5/91
[52] U.S. Cl. ................. 358/174; 360/65; 358/335
[58] Field of Search ............. 358/174, 315, 316, 318, 358/175, 310, 27, 38, 335; 333/17R, 18; 360/65, 67; 375/12, 13, 14; H04N 5/91, 5/92, 5/52

[56] References Cited

U.S. PATENT DOCUMENTS

| | | | |
|---|---|---|---|
| 4,484,237 | 11/1984 | Muto | 360/65 |
| 4,807,056 | 2/1989 | Sasaki et al. | 360/27 |
| 4,928,287 | 5/1990 | Tanaka | 360/65 |
| 5,067,137 | 11/1991 | Kaneko | 333/18 |
| 5,124,850 | 6/1992 | Kitu | 358/335 |

FOREIGN PATENT DOCUMENTS 0171759 2/1986 European Pat. Off. .
0369756 5/1990 European Pat. Off. .
2506981 12/1982 France .
2102257 1/1983 United Kingdom .

OTHER PUBLICATIONS

J. F. Robinson 'Videotape Recording: Theory and Practise' 1981, 3rd Edition, Focal Press, London, GB; Chapter 7, sections: "Equalisers" and The Cosine Equaliser on pp. 123-126.

Primary Examiner—James J. Groody
Assistant Examiner—David E. Harvey
Attorney, Agent, or Firm—Lewis H. Eslinger; Jay H. Maioli

[57] ABSTRACT

An equalization circuit for a reproduced video signal detects the levels of a reference signal in two different frequency bands and, based on a comparison of the detected levels, selects an equalization curve from a memory and controls the equalization characteristic of an equalizer in the signal path based on the selected equalization curve. For a video frequency signal, low-pass and high-pass filters provide the two frequency bands for level checking and for a radio frequency signal two bandpass filters provide the frequency bands of interest located above and below the center color carrier frequency. A memory contains a number of equalization curves, one of which is selected based upon a comparison using the detected reference signal levels that is performed in a central processing unit.

20 Claims, 7 Drawing Sheets

VIDEO EQUALIZING CIRCUIT

BACKGROUND OF THE INVENTION

1. Field of the Invention

The present invention relates generally to a video signal reproducing apparatus and, more particularly, to an equalizer for compensating nonlinearities in the reproduced video signal.

2. Description of the Background

It is typical practice to adjust the equalizing characteristic of a video signal equalizer or an RF signal equalizer in a conventional video reproducing apparatus at the time such apparatus is manufactured. For example, following the manufacture of a video tape recorder (VTR) a reference signal that was previously recorded on a reference tape is reproduced over each completed VTR and the equalizer is set to allow the reference signal to lie within standard limits, while observing the waveform of the reproduced reference signal in every operating mode of the VTR. While this procedure produces generally acceptable results, there is a problem in that the above conventional adjusting operations are complicated and require considerable skill in performing the large number of adjusting steps. Thus, not only is the equalizer circuit adjustment costly during the manufacturing process, it is difficult to obtain the necessary skilled personnel to perform the work.

OBJECTS AND SUMMARY OF THE INVENTION

Accordingly, it is an object of the present invention to provide a method and apparatus for adjusting a video equalizing circuit that can eliminate the above-noted defects inherent in previously proposed systems.

It is another object of the invention to provide a method and apparatus for adjusting a reproducing apparatus that can automatically adjust the equalizing characteristics of an equalizing circuit contained therein.

According to an aspect of the present invention, a video signal reproducing apparatus is provided with an equalizing circuit for equalizing a signal reproduced from a recording medium by a desired characteristic, an extraction circuit for extracting one or a plurality of frequency components from the reproduced signal, a comparing circuit for comparing levels between the extracted frequency components or between the extracted frequency component and a predetermined reference value, and a control circuit for controlling the equalizing characteristic of the equalizing circuit on the basis of the results of the level comparison.

In the operation of the above system, upon extracting one or a plurality of frequency components from the reproduced signal, the levels are compared between the extracted frequency components or between the extracted frequency component and a predetermined reference value, and the circuit is connected so that the equalizing characteristic of the equalizing circuit is automatically adjusted on the basis of the result of the level comparison.

The manner in which the above and other objects, features, and advantages of the present invention are provided will be apparent from the following detailed description and drawings, in which like reference numerals represent the same or similar elements.

DETAILED DESCRIPTION OF PREFERRED EMBODIMENTS

It is a feature of a reproducing apparatus according to the present invention that the adjustment of the equalizing characteristic of an equalizer for an RF signal or a video signal can be automatically performed. Thus, a VTR that can record/reproduce and that has an automatic gain control will be described as an example.

Figure 1:
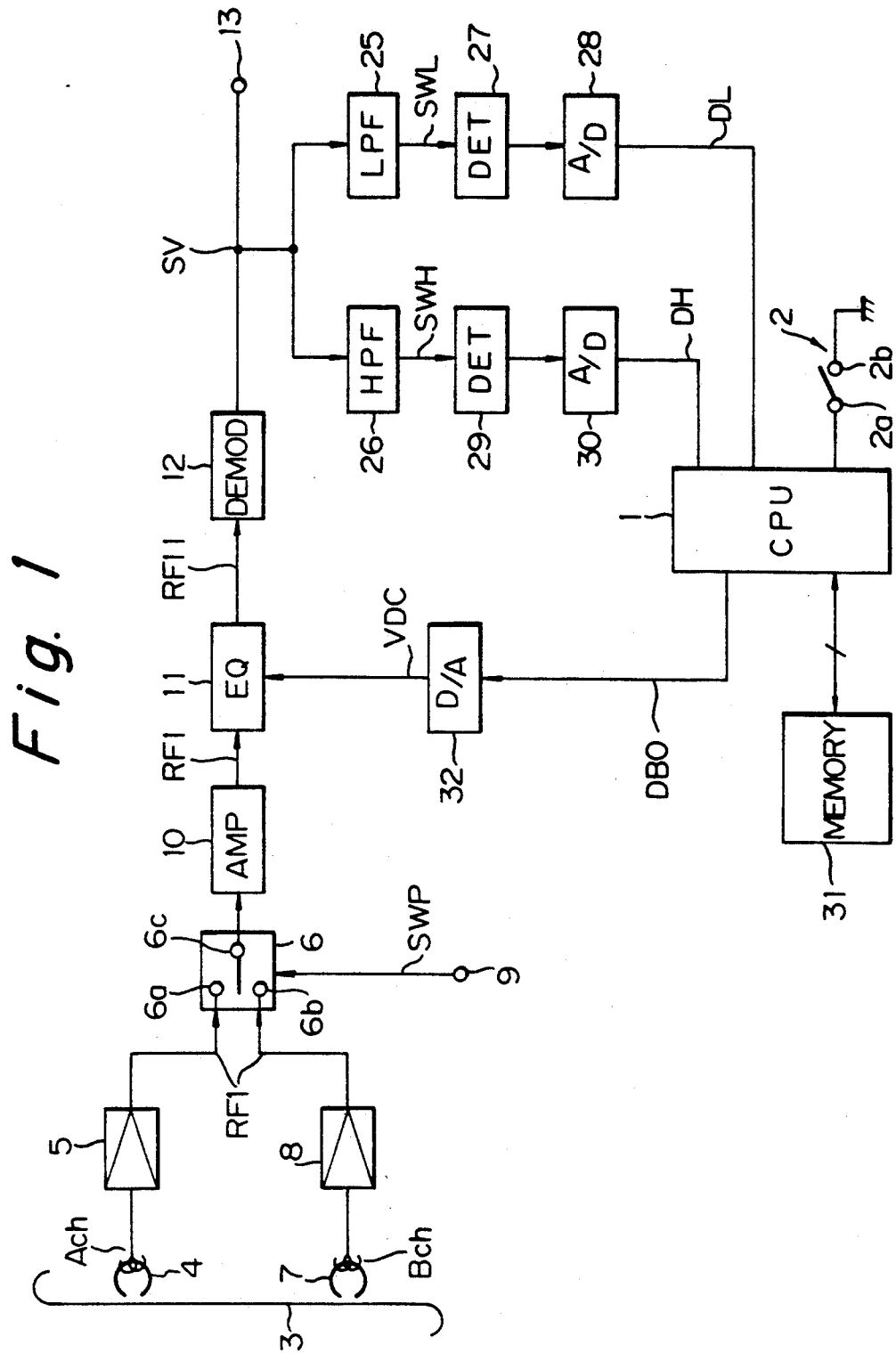
FIG. 1 is a schematic in block diagram form of a video equalizer circuit according to an embodiment of the present invention.

FIG. 1 shows a system to automatically equalize a reproduced video signal, in which when terminals 2a and 2b of an automatic adjusting mode switch 2 provided in a central processing unit (CPU) are connected, the automatic equalization adjusting mode is set.

Figure 2A:
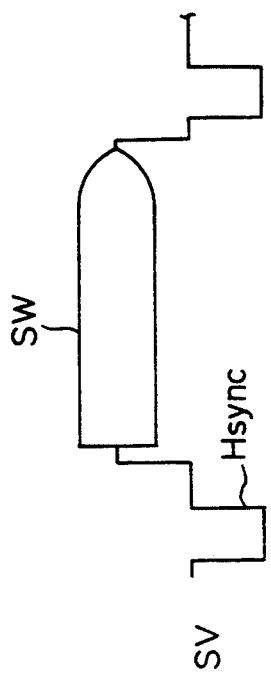
FIGS 2A-2C are waveform diagrams showing signals that are used to adjust the equalizing characteristic of the circuit of FIG. 1.

In the system of FIG. 1, a video signal SV shown in FIG. 2A is reproduced from a magnetic tape 3 by a magnetic head 4 in the A channel (Ach) as a radio frequency (RF) signal RF1. The RF signal RF1 is supplied through an amplifier 5 to an input terminal 6a of a changeover switch 6. Similarly, another video signal SV is reproduced from the magnetic tape 3 by a second magnetic head 7 in the B channel (Bch) as a second RF signal RF1 that is supplied through an amplifier 8 to another input terminal 6b of switch 6. Switch 6 also has a single output terminal 6c.

The connecting state of the input to the output of switch 6 is controlled by a switching pulse SWP that is supplied thereto through an input terminal 9. As expected, upon reproduction of the A channel, terminals 6a and 6c of switch 6 are connected and, upon reproduction of the B channel, terminals 6b and 6c of switch 6 are connected. The RF signal RF1 that has thus passed through switch 6 is supplied to an equalizer 11 via an amplifier 10.

Figure 3:
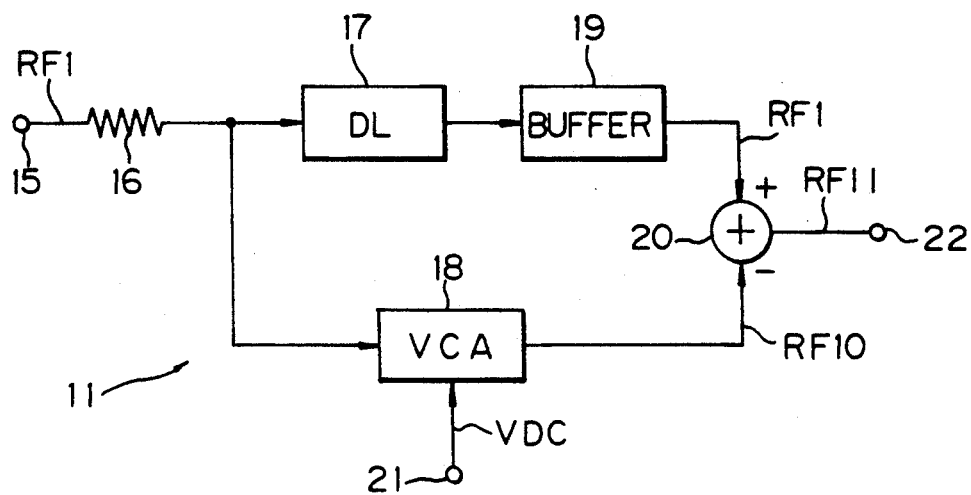
FIG. 3 is a block diagram showing a construction of an equalizer used in the circuit of FIG. 1.
Figure 4:
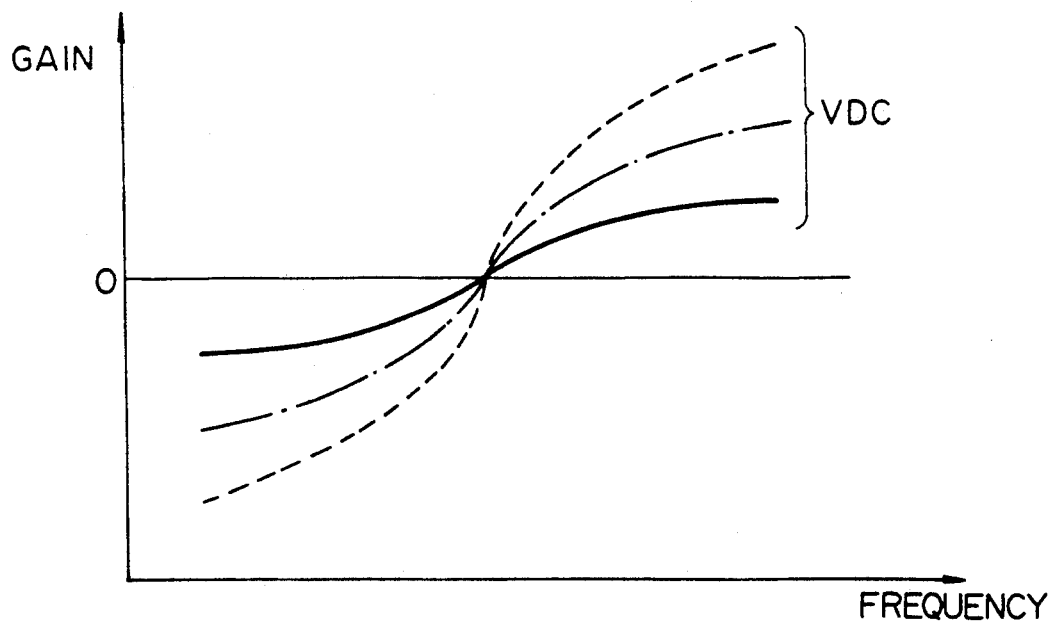
FIG. 4 is a graphical representation of equalizing characteristics of the equalizer of FIG. 4.

One example of equalizer 11 might be a cosine equalizer, and an exemplary circuit of equalizer 11 is shown in FIG. 3. Frequency characteristics of equalizer 11 are shown in FIG. 4 from which it will be understood that the gain of equalizer 11 is controlled by a DC analog voltage VDC that can have different levels. Although as an example a cosine equalizer is described in the instant embodiment, the present invention is not limited to such a cosine equalizer and other kinds of equalizer construction can be used as well.

Referring to FIG. 3, the RF signal RF1, which is fed in at an input terminal 15, is supplied through a resistor 16 to a delay circuit 17 and to a gain adjusting circuit 18, which may comprise a voltage-controlled amplifier. The delay circuit 17 provides a time delay in the range of tens of nanoseconds (nsec). The input RF signal RF1 is delayed by delay circuit 17 and is then supplied to one input of an adding circuit 20 through a buffer 19.

In the gain adjusting circuit 18 that also receives the RF signal RF1, gain control is performed in response to a DC analog voltage VDC that is fed in at a terminal 21. The gain-controlled RF signal RF10 produced by gain adjusting circuit 18 is supplied to another input of adding circuit 20, which in this case is a minus input.

Using this input connection, adding circuit 20 executes a subtraction between the RF signal RF1 supplied from buffer 19 and the RF signal RF10 supplied from gain adjusting circuit 18. The output RF signal RF11 represents the difference and is fed out at terminal 22.

Turning back to FIG. 1, the RF signal RF11 that has been adjusted to a desired characteristic by equalizer 11 is supplied to a demodulating circuit 12. Demodulating circuit 12 frequency demodulates the RF signal RF11 down to the video signal SV, a typical waveform of which is shown in FIG. 2A. A sweep signal SW that is part of the reference or calibration signal originally recorded on the test tape 3 used for this gain equalization is shown in FIG. 2A multiplexed to the demodulated video signal SV for a period of almost one horizontal scan line (1H).

Figure 2B:
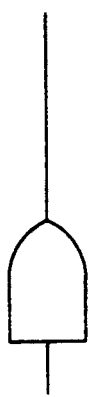
Figure 2C:

For instance, if a sine wave is used as the sweep signal SW then, as shown in FIG. 2B, a low-frequency component SWL is provided in the trailing half of the sweep signal SW over a 1H period. As shown in FIG. 2C, a high-frequency component SWH is then provided in the leading half of the sweep signal SW. The demodulated video signal SV is supplied to both a low-pass filter 25 and a high-pass filter 26 and also supplied through output terminal 13 to a signal processing circuit of the main system (not shown) where it is processed in the normal fashion.

In low-pass filter 25, the low-frequency component SWL of the sweep signal SW shown in FIG. 2B that is multiplexed to the video signal SV is extracted and supplied to a detecting circuit 27. Detecting circuit 27 detects the level of the low-frequency component SWL of the sweep signal SW, and then the low-frequency component SWL is converted into a digital data signal DL by an analog-to-digital (A/D) converter 29 and supplied to CPU 1.

In the high-pass filter 26, a high-frequency component SWH of the sweep signal SW shown in FIG. 2C that is multiplexed to the video signal SV is extracted and supplied to a second detecting circuit 29. Detecting circuit 29 detects a level of the high-frequency component SWH of the sweep signal SW, and then the high-frequency component SWH is converted into a digital data signal DH by an analog-to-digital (A/D) converter 30 and supplied to CPU 1.

In CPU 1, the digital data signals DL and DH are first stored in a memory 31 and then the respective levels of the digital data signals DL and DH are compared to each other. Digital data DBO to control the boost or cut amount of equalizer 11 is stored in memory 31 and subsequently supplied to a digital-to-analog (D/A) converter 31 under control of CPU 1.

Figure 5:
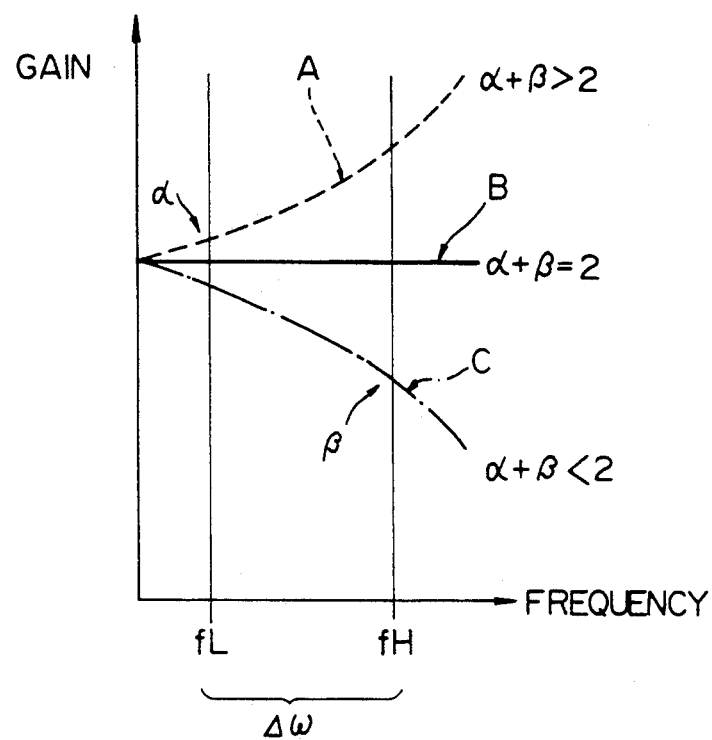
FIG. 5 is a graphical representation of gain control useful in explaining the equalization of a video signal.

The level comparison and analysis of the digital data signals DL and DH is described hereinbelow. Referring to FIG. 5, which is a graph of gain versus frequency, and assuming that the gain at a frequency fL, which is a relatively low frequency, is set to $\alpha$ and the gain at a frequency fH, which is a relatively high frequency, is set to $\beta$ and assuming further that fL and fH are spaced apart by a predetermined frequency $\Delta\omega$, the following cases are considered as a result of the sum of the gains $\alpha$ and $\beta$.

curve A ... $\alpha + \beta > 2$
curve B ... $\alpha + \beta = 2$
curve C ... $\alpha + \beta < 2$ The use of the integer two as a reference is arbitrary, however, it has been found through experiments and analysis that two is the value around which the video gain optimally varies.

It is known that the frequency characteristic of the video signal SV is linear if the curves are symmetrically moved so as to satisfy the condition of curve B, that is, $\alpha + \beta = 2$. Therefore, by controlling the characteristic of equalizer 11 so as to satisfy that condition ($\alpha + \beta = 2$) the frequency characteristic of the video signal SV can be adjusted or equalized to be linear.

Figure 6A:
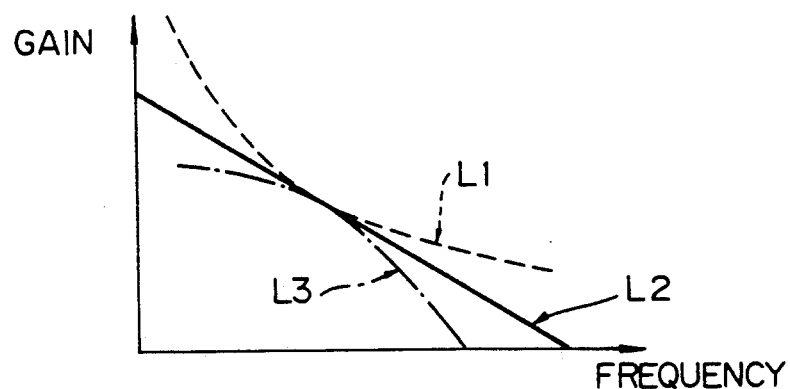
FIGS 6A-6C are graphical representations useful in explaining the equalization characteristic of the circuit of FIG. 1.
Figure 6B:
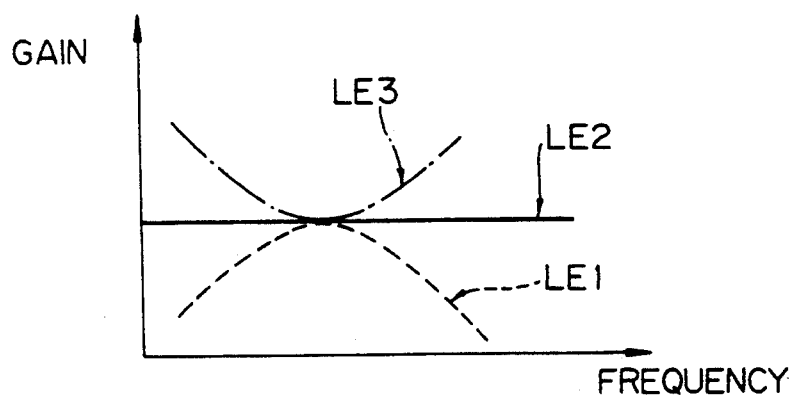

FIG. 6A represents the gain versus frequency characteristics for the video signal SV for three different cases. When video signal SV has a characteristic corresponding to curve L1, a flat linear frequency characteristic D (FIG. 6C) of the video signal SV can be obtained by setting the equalizing characteristic of equalizer 11 to match curve LE1 shown in FIG. 6B. When video signal SV has a characteristic corresponding to curve L2, a flat linear frequency characteristic E (FIG. 6C) of the Video signal SV that is bounded and has finite slope can be obtained by setting the equalizing characteristic of equalizer 11 to match curve LE2 shown in FIG. 6B. Further, when video signal SV has a characteristic corresponding to curve L3 shown in FIG. 6A, a flat linear frequency characteristic D (FIG. 6C) of the video signal SV can be obtained by setting the equalizing characteristic of equalizer 11 to match curve LE3 shown in FIG. 6B.

Figure 6C:
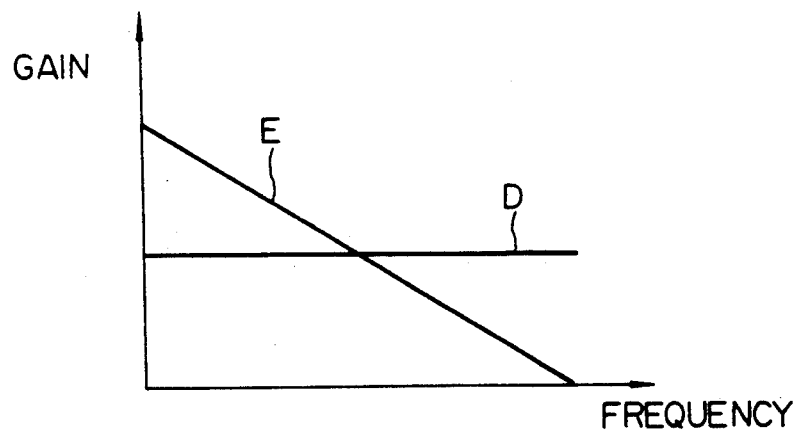

Although the frequency characteristic curve E shown in FIG. 6C has a negative slope, it is a straight line and, thus, linear and it satisfies the condition ($\alpha + \beta = 2$), so that the desired linear frequency characteristic of the equalized signal is obtained.

In the D/A converter 32 of FIG. 1, the digital data DBO from CPU 1 is converted into the DC analog voltage VDC that is supplied to set the equalization curve of equalizer 11. Thus, the equalizing characteristic of equalizer 11 can be controlled as described above in relation to FIGS. 5 and 6A–6C.

In the embodiment of FIG. 1, the portion comprising low-pass filter 25, high-pass filter 26, detecting circuits 27 and 29, and A/D converters 28 and 30, could be modified to provide a switching circuit (not shown) following the two detecting circuits 27 and 29. In such modified embodiment, only one A/D converter would be required and the outputs of the detecting circuits 27 and 29 would be supplied to CPU 1 through the switching circuit and the single A/D converter. CPU 1 would control the switching circuit to change its connecting state every horizontal line scan 1H.

As a further modification of the level comparison in the above embodiment, the gain of equalizer 11 could be also controlled by comparing the present data DH and DL fed to CPU 1 with the levels of the preceding data DH and DL for every horizontal scan period 1H.

In the above description of FIG. 1, the low-frequency component SWL of the sweep signal SW that is part of the calibration signal is extracted by low-pass filter 25 and the high-frequency component SWH of the sweep signal SW is extracted by high-pass filter 26. In the embodiment of FIG. 1, it is also possible to eliminate the sync signal typically included in the video signal SV by providing filters between the demodulating circuit 12 and low-pass filter 25 and high-pass filter 26.

Figure 7:
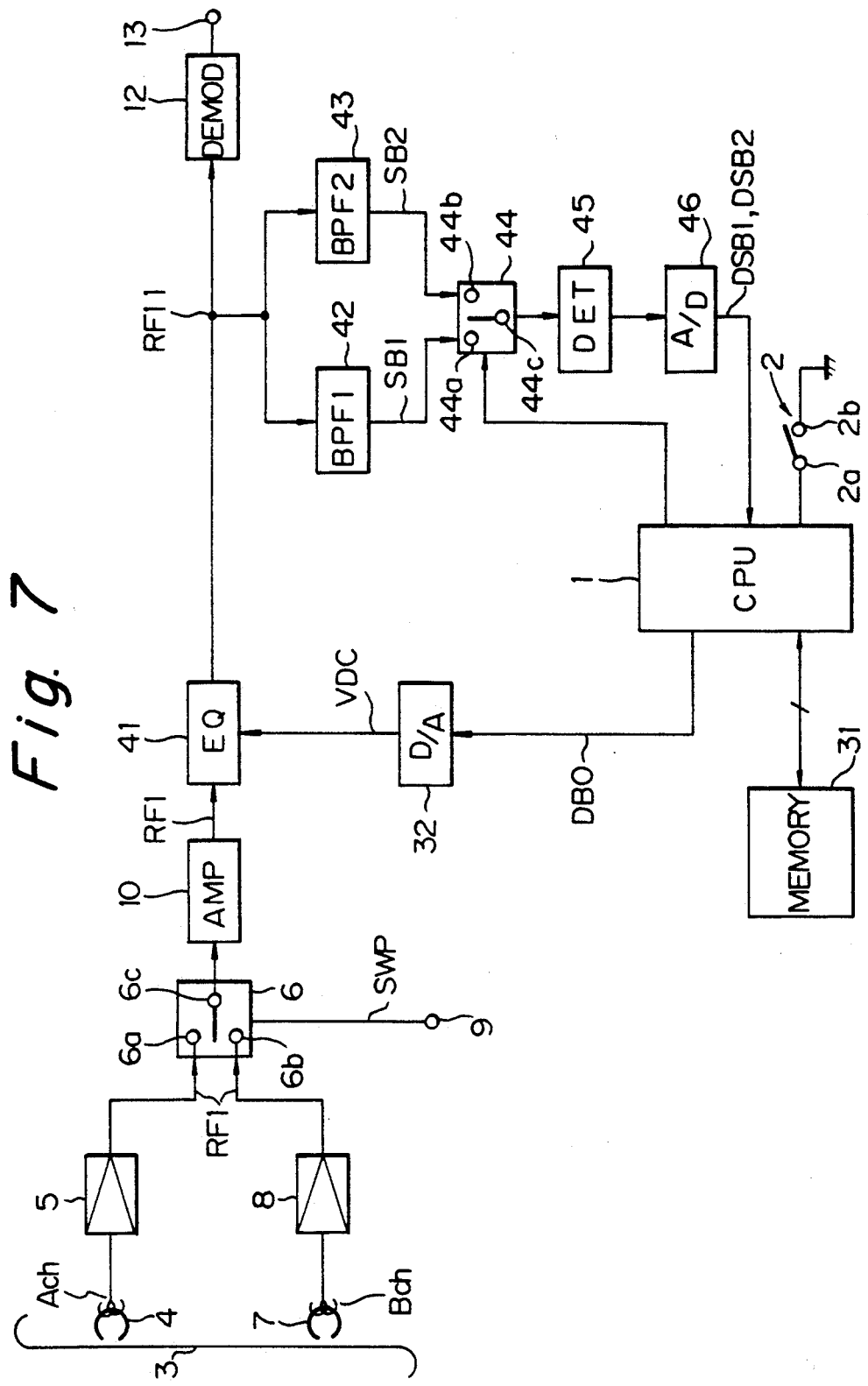
FIG. 7 is a schematic in block diagram form of another embodiment of the present invention.

The above description was concerned with an embodiment for equalizing a signal in the video frequency band and an embodiment for equalizing a signal in the RF frequency band will now be described. FIG. 7 shows a construction to automatically equalize the RF signal in which portions that are common to the system of FIG. 1 are designated by the same reference numerals and further explanations are omitted. It is assumed that CPU 1 is set into the automatic adjusting mode.

In the circuit of FIG. 7, an RF signal RF 1 reproduced by magnetic head 4 of the A channel (Ach) is supplied through amplifier 5 to an input of switch 6. Similarly, the RF signal RF1 reproduced by magnetic head 7 of the B channel (Bch) is supplied through amplifier 8 to another input of switch 6. The RF signal RF1 is selectively fed through switch 6 to amplifier 10 and then supplied to an equalizer 41. The RF signal RF11 that has been adjusted to a desired characteristic by equalizer 41 is further supplied to demodulating circuit 12 and also to bandpass filters 42 and 43.

Demodulating circuit 12 frequency demodulates the RF signal RF11 to the video signal frequency band, and the demodulated signal is supplied to a signal processing circuit of the main system (not shown) through output terminal 13

Figure 8A:
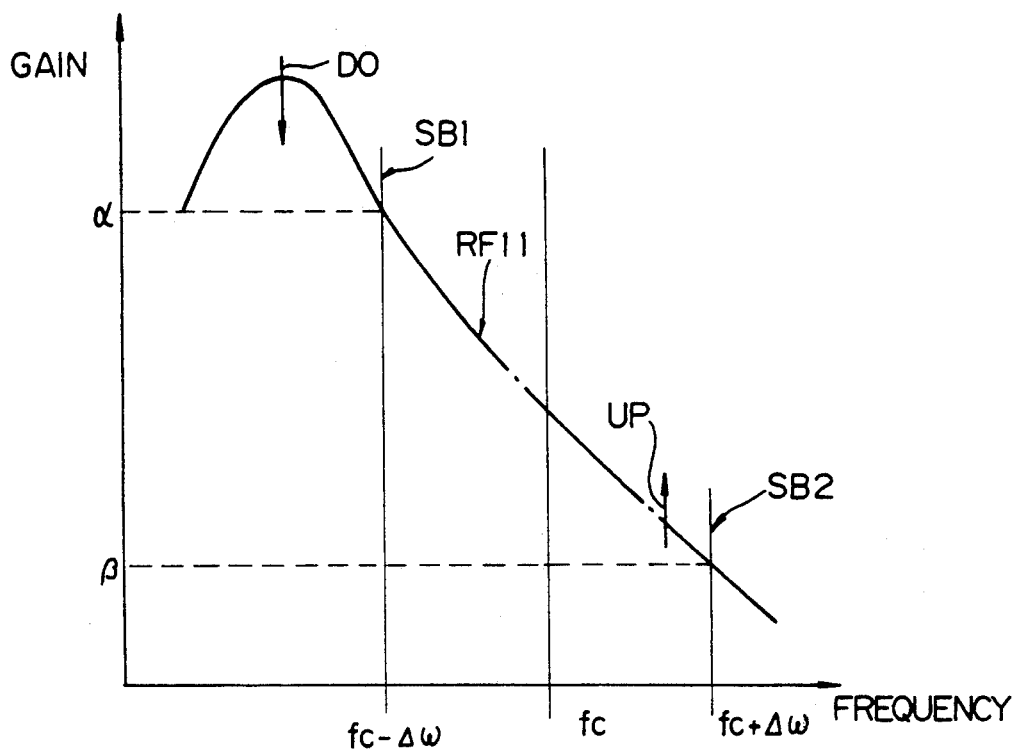
FIGS. 8A and 8B are graphical representations useful in explaining the equalization of an RF signal and the equalizing characteristic curves of the equalizer.

Bandpass filters 42 and 43 extract respective side band signals SB1 and SB2. As shown in FIG. 8A, side bands SB1 and SB2 have frequencies (fc±Δω) that are located above and below the center or carrier frequency fc by a predetermined frequency amount (±Δω). More specifically, the side band SB1 is extracted by bandpass filter 42 and supplied to a first input terminal 44a of a switch 44, and the side band SB2 is extracted by bandpass filter 43 and supplied to a second input terminal 44b of switch 44. The output of switch 44 is fed out at terminal 44C to a detector 45.

The connection state of switch 44 is selected by a control signal supplied from CPU 1, for example, by a signal corresponding to the switching pulse signal SWP sent by CPU1 to switch 6. The side band SB1 or SB2 selected through switch 44 is supplied to detecting circuit 45 that detects the level of the side band SB1 or SB2. The detected level is converted into digital data DSB1 or DSB2 by an A/D converter 46 and supplied to CPU 1.

In CPU 1, the digital data DSB1 or DSB2 is stored in memory 31 and, subsequently, the levels of data DSB1 and DSB2 are compared. The digital data DBO that serves to control the equalization of equalizer 41 is also stored in memory 31 and supplied to D/A converter 32.

Figure 8B:
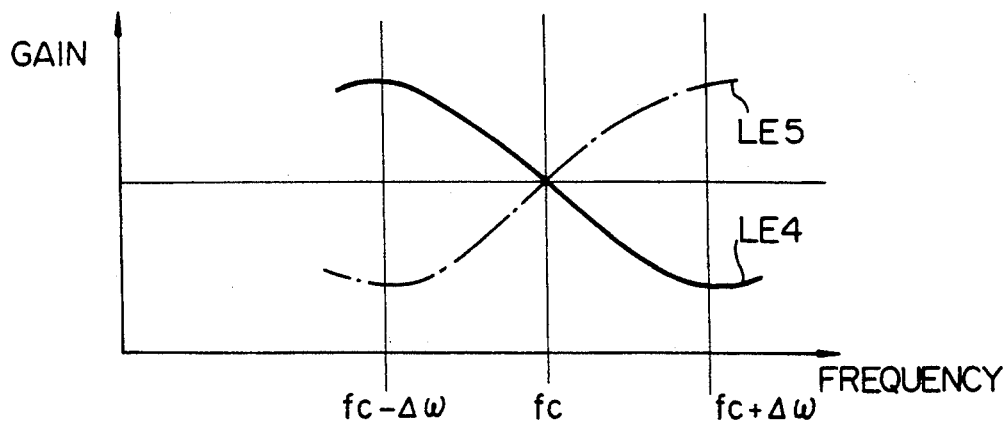

The level comparison of the data DSB1 or DSB2 stored in memory 31 is explained in connection with FIGS. 8A and 8B. FIG. 8A shows the frequency characteristic of the reproduced RF signal RF11 and in that regard, although the signal-to-noise ratio (S/N) is improved by emphasizing the low-frequencies, an inversion reduction occurs and the waveform characteristic deteriorates. On the other hand, although the (S/N) ratio deteriorates somewhat upon emphasizing the high-frequencies, the inversion reduction is less likely to occur and the waveform characteristic is improved.

As shown in FIG. 8A, assuming that the gain of the side band SB1 on the low-frequency side is set to $\alpha$ and the gain of the side band SB2 on the high-frequency side is set to $\beta$, the equalizing characteristic of equalizer 41 should be controlled so as to satisfy the following equation:

$$(\alpha/\beta) = K$$

For the frequency characteristic of the RF signal RF11 shown in FIG. 8A, by controlling the equalization characteristic of equalizer 41 in accordance with an equalizing characteristic curve LE5 (FIG. 8B), the response on the low-frequency side of the RF signal RF11 can be reduced as shown by an arrow marked D0 and the response on the high-frequency side can be increased, as shown by an arrow marked UP.

In this case, which differs from the adjustment of the frequency characteristic of the video signal SV, the linearity is not a problem but it is important to control it so as to obtain the predetermined ratio K between the gains of the side bands SB1 and SB2, which are away from the center carrier frequency fc by predetermined frequency amounts (±Δω). Because of this, the (S/N) ratio is assured, waveform deterioration can be prevented, and the inversion reduction can be prevented.

In D/A converter 32, the digital data DBO from CPU 1 is converted into the DC analog voltage VDC and supplied to equalizer 41. Equalizer 41 executes gain control in response to the DC analog voltage VDC in a manner such that the ratio between the gains of the side bands SB1 and SB2 on both sides of the center carrier frequency fc is equal to the predetermined ratio ($\alpha/\beta = K$). The construction of equalizer 41 is the same as that of equalizer 11 and the detailed description thereof is omitted.

A modification of the adjustment of the frequency characteristic of the video signal SV uses the fact that in the case where the video signal SV has been adjusted, the response of the circuit is decided to be a predetermined standard value and the response level on the low-frequency side becomes constant In such a case, the level on the low-frequency side mentioned above is previously stored in memory 31 and only the single high-frequency component SWH is used as a sweep signal SW which is multiplexed to the video signal SV. The reproduced high-frequency component SWH is then compared with a predetermined level on the low-frequency side by the CPU 1, and a boost amount on the high-frequency side is controlled so as to satisfy a level on the high-frequency side for a predetermined frequency.

In this above-described modified embodiment, low-pass filter 25 on the low-frequency side, detecting circuit 29, and A/D converter 28 are unnecessary. On the other hand, on the high-frequency side as well, since only the single carrier high-frequency component SWH is used as a sweep signal SW, high-pass filter 26 is unnecessary and only the detecting circuit 29 and the A/D converter 30 are left.

Although the above embodiments have been described with respect to an example in which the gain control of equalizer 11 and the gain control of equalizer 41 are individually performed, the present invention need not be so limited. For instance, the gain adjustment can be also performed in an embodiment in which equalizers 11 and 41 are cascade-connected in two stages. By the proper adjustment of equalizers 11 and 41 in keeping with the above, the frequency characteristic of the video signal SV can be made linear and the ratio between the side band SB1 on the low-frequency side and the side band SB2 on the high-frequency side can be set to a predetermined ratio K.

According to the present invention, one or a plurality of frequency components are extracted from the reproduced signal, the levels are compared between the extracted frequency components or between the extracted frequency component and a predetermined reference value, and the equalizing characteristics of the equalizers 11 and 41 are controlled on the basis of the result of the level comparison. Therefore, the gain adjustments for the frequency characteristic of the video signal SV and the frequency characteristic of the RF signal can be automatically executed. The equalizing characteristic of the equalizing means can be automatically adjusted by reproducing a pre-recorded tape containing a reference signal without using any special measuring instruments. Thus, it is possible to eliminate the high level of skill required by the operator used to perform the adjusting operation, and to realize a decrease in the number of adjusting steps and a decrease in the number of volume levels checked.

Further, in the gain adjustment for the frequency characteristic of the RF signal, the gains of the side bands SB1 and SB2 which are separated from the center carrier fc by predetermined frequencies ($\pm\Delta\omega$) are controlled so as to be equal to a predetermined ratio K. Therefore, the (S/N ratio) can be assured, waveform deterioration can be prevented, and the inversion reduction can be prevented.

If the gains are adjusted in a state in which the equalizers 11 and 41 are cascade-connected in two stages, the frequency characteristic of the video signal SV can be made linear by adjusting equalizer 11. By adjusting equalizer 41, the ratio between the side band SB1 on the low-frequency side and the side band SB2 on the high-frequency side can be set to a predetermined ratio K. Therefore, the (S/N ratio) can be assured, the waveform deterioration can be prevented, and the inversion reduction can be prevented.

According to the present invention, one or a plurality of frequency components are extracted from a reproduced signal, the levels are compared between the extracted frequency components or between the extracted frequency component and a predetermined reference value, and the equalizing characteristic of the equalizer is controlled on the basis of the result of the level comparison. Therefore, there is an effect such that by merely reproducing a reference tape, the adjustment of the equalization characteristic of the equalizer means can be automatically performed without using any special measuring instruments. Thus, it is possible to reduce the level of skill required for the adjusting operation and to decrease the number of adjusting steps and to decrease the number of volume levels that are checked.

Having described preferred embodiments with reference to the accompanying drawings, it is to be understood that the invention is not limited to those precise embodiments and that various changes and modifications could be effected by one skilled in the art without departing from the spirit or scope of the novel concepts of the invention, as defined in the appended claims.

What is claimed is:

1. An equalization system for a signal reproduced from a recording medium by a reproducing apparatus, comprising:

means for equalizing a signal reproduced from a recording medium in response to an equalization control signal;

means for detecting respective levels of a plurality of different frequency components in the signal reproduced from the recording medium;

means for analyzing the detected levels of the respective different frequency components and determining a required equalization; and means responsive to a determined required equalization from said means for analyzing for providing the equalization control signal to control a characteristic of said means for equalizing so that $\alpha+\beta=2$, where $\alpha$ is a gain at a relatively low frequency and $\beta$ is a gain at a relatively high frequency, whereby an output signal of said means for equalizing is adjusted to be linear.

2. An equalization system according to claim 1, wherein the signal reproduced from the record medium is a video signal and said means for detecting comprises a low-pass filter and a high-pass filter both receiving the reproduced signal for detecting respective levels in low-frequency components and high-frequency components thereof.

3. An equalization system according to claim 2, wherein said means for detecting further comprises first and second level detectors connected to said low-pass and high-pass filters, respectively, and first and second analog-to-digital converters for receiving respective detected levels and producing digital outputs therefrom fed to said means for analyzing.

4. An equalization system according to claim 1, wherein the signal reproduced from the recording medium is a modulated radio frequency signal, and said means for detecting comprises first and second bandpass filters both receiving the reproduced signal for detecting levels in a low-frequency sideband and a high-frequency sideband, respectively.

5. An equalization system for a signal reproduced from a recording medium by a reproducing apparatus, comprising:

means for equalizing a signal reproduced from a recording medium in response to an equalization control signal;

means for detecting respective levels of a plurality of different frequency components in the signal reproduced from the recording medium;

means for analyzing the detected levels of the respective different frequency components and determining a required equalization; and means responsive to a determined required equalization from said means for analyzing for providing the equalization control signal, whereby an output signal of said means for equalizing is equalized;

wherein the signal reproduced from the recording medium is a modulated radio frequency signal, and said means for detecting comprises first and second bandpass filters both receiving the reproduced signal for detecting levels in a low-frequency sideband and a high-frequency sideband, respectively; and wherein the signal reproduced is a video signal and said means for detecting further comprises switch means for selectively connecting an output from one of said first and second bandpass filters to a level detector for detecting the levels of the low-frequency sideband and the high-frequency sideband, said switch means selecting an alternate input each horizontal scan line of the video signal.

6. An equalization system according to claim 5, wherein said means for detecting further comprises an analog-to-digital converter for converting an output of said level detector to a digital signal fed to said means for analyzing.

7. An equalization system according to claim 1, wherein said means for equalizing comprises a cosine equalizer including a voltage controlled amplifier receiving said equalization control signal.

8. An equalization system according to claim 1, wherein said means for analyzing includes a memory for storing therein data for at least one equalization characteristic curve selected in response to a determined required equalization.

9. An equalization system according to claim 8, wherein said means for analyzing further includes a central processing unit receiving the detected levels for comparing a sum thereof to a predetermined number and selecting equalization curve data from said memory in response to said comparison.

10. An equalization system according to claim 8, wherein said means for analyzing further includes a central processing unit receiving the detected levels for comparing a ratio thereof to a predetermined constant and selecting equalization curve data from said memory in response to said comparison.

11. An equalization system according to claim 10, wherein said means for analyzing further includes a digital-to-analog converter for converting the equalization curve data from said memory into an analog voltage constituting said equalization control signal.

12. A system for equalizing reproduced signals, comprising:
   means for equalizing a reproduced signal in response to an equalization characteristic control signal;
   means for reproducing a reference signal from a record medium;
   means for detecting respective levels of two different frequency components in the reference signal reproduced from the recording medium;
   means for analyzing the detected levels of the respective different frequency components and determining a required equalization; and
   means responsive to said means for analyzing for selecting an equalization characteristic curve and generating a corresponding equalization characteristic control signal to control a characteristic of said means for equalizing so that $\alpha + \beta = 2$, where $\alpha$ is a gain at a relatively low frequency and $\beta$ is a gain at a relatively high frequency, whereby an output signal of said means for equalizing is adjusted to be linear.

13. A system according to claim 12, wherein the reference signal reproduced from the record medium includes a video signal and said means for detecting comprises a low-pass filter and a high-pass filter both receiving the reproduced reference signal and video signal for detecting respective levels in low-frequency components and high-frequency components thereof.

14. A system according to claim 12, wherein the reference signal reproduced from the recording medium includes a modulated radio frequency signal, and said means for detecting comprises first and second bandpass filters both receiving the reproduced signal for detecting levels in a low-frequency sideband and a high-frequency sideband of a central carrier frequency, respectively.

15. A system for equalizing reproduced signals, comprising:
   means for equalizing a reproduced signal in response to an equalization characteristic control signal;
   means for reproducing a reference signal from a record medium;
   means for detecting respective levels of two different frequency components in the reference signal reproduced from the recording medium;
   means for analyzing the detected levels of the respective different frequency components and determining a required equalization; and
   means responsive to said means for analyzing for selecting an equalization characteristic curve and generating a corresponding equalization characteristic control signal;
   wherein the reference signal reproduced from the recording medium includes a modulated radio frequency signal, and said means for detecting comprises first and second bandpass filters both receiving the reproduced signal for detecting levels in a low-frequency sideband and a high-frequency sideband of a central carrier frequency, respectively; and
   wherein the modulated radio frequency signal is a video signal and said means for detecting further comprises switch means for selectively connecting an output from one of said first and second bandpass filters to a level detector for detecting the levels of the low-frequency sideband and the high-frequency sideband, said switch means selecting an alternate input each horizontal scan line of the video signal.

16. A system according to claim 12, wherein said means for equalizing comprises a cosine equalizer including a voltage controlled amplifier receiving said equalization characteristic control signal.

17. A system according to claim 12, wherein said means for selecting an equalization characteristic curve includes a memory for storing therein data for a plurality of equalization characteristic curves selected in response to said means for analyzing.

18. A system according to claim 17, wherein said means for analyzing includes a central processing unit receiving the detected levels for comparing a sum thereof to a predetermined number and based on a result of the comparison causing said means for selecting to select an equalization characteristic curve from said memory.

19. An equalization system according to claim 17, wherein said means for analyzing includes a central processing unit receiving the detected levels for comparing a ratio thereof to a predetermined constant and based on a result of said comparison causing said means for selecting to select an equalization characteristic curve data from sid memory.

20. An equalization system according to claim 19, wherein said means for selecting further includes a digital-to-analog converter for converting the equalization characteristic curve data from said memory into a analog voltage constituting said equalization characteristic control signal.

* * * * *